United States Patent [19]

Ishikawa et al.

[11] Patent Number: 5,450,319
[45] Date of Patent: Sep. 12, 1995

[54] ELECTRONIC CASH REGISTER CAPABLE OF DECIDING VALIDITY OR INVALIDITY OF REGISTER OPERATOR

[75] Inventors: Kenichi Ishikawa; Seiji Fuyama, both of Yokohama, Japan

[73] Assignee: Matsushita Electric Industrial Co., Ltd., Osaka, Japan

[21] Appl. No.: 796,594

[22] Filed: Nov. 22, 1991

[30] Foreign Application Priority Data

Nov. 30, 1990 [JP] Japan .................................. 2-338222

[51] Int. Cl.6 ............................................. G07G 1/12
[52] U.S. Cl. ................................ 364/405; 340/825.31
[58] Field of Search .............................. 364/401, 405; 340/825.3, 825.31, 825.34, 825.35

[56] References Cited

U.S. PATENT DOCUMENTS

| | | | |
|---|---|---|---|
| 4,095,739 | 6/1978 | Fox et al. ................... | 235/387 |
| 4,570,223 | 2/1986 | Yoshimoto .................. | 364/405 |
| 4,651,279 | 3/1987 | Suzuki ....................... | 364/405 |
| 4,935,608 | 6/1990 | Tanaka ....................... | 235/380 |

FOREIGN PATENT DOCUMENTS

| | | | |
|---|---|---|---|
| 0079363 | 6/1981 | Japan .......................... | 364/405 |
| 0118169 | 9/1981 | Japan .......................... | 364/405 |
| 0178554 | 11/1982 | Japan .......................... | 364/405 |
| 0191065 | 11/1983 | Japan .......................... | 364/405 |
| 0079464 | 5/1985 | Japan .......................... | 364/405 |
| 0079465 | 5/1985 | Japan .......................... | 364/405 |
| 2207393 | 8/1990 | Japan .......................... | 364/405 |

*Primary Examiner*—David M. Huntley
*Attorney, Agent, or Firm*—Spencer, Frank & Schneider; Christopher H. Lynt

[57] ABSTRACT

An electronic cash register system includes a plurality of electronic cash registers interconnected by a common transmission line, and each of the electronic cash registers includes an information register device for registering flag information which "validates" or "invalidates" registration of each individual cashier as a register operator. Each of the electronic cash registers also includes a memory for storing the flag information, and an information transmission control device for controlling transmission of the flag information to the other electronic cash registers, when flag information is updated. Each of the electronic cash registers stores the flag information in its memory, when updated, and transmits, at the same time, the same flag information to the other electronic cash registers interconnected on the common transmission line. Each of the electronic cash registers receives the flag information to update the flag information stored in its memory and references the stored flag information so as to control the "validity" or "invalidity" of registration of the cashier as a register operator on the basis of the stored flag information.

8 Claims, 5 Drawing Sheets

ELECTRONIC CASH REGISTER CAPABLE OF DECIDING VALIDITY OR INVALIDITY OF REGISTER OPERATOR

BACKGROUND OF THE INVENTION

This invention relates to an electronic cash register apparatus (referred to hereinafter as an ECR) capable of assessing the "validity" or "invalidity" of employees or register operators (referred to hereinafter as cashiers) who are in charge of the ECR.

A conventional ECR of this kind stores information with regard to individual cashiers, and a method for registering cashiers in such an ECR is already known. According to this known method, personal cashier numbers and/or personal identification numbers of the individual cashiers are stored beforehand in a memory of the ECR, and, when one of the cashiers starts to operate the ECR, this specific cashier is registered in the ECR.

FIG. 1 is a flow chart showing the operation of the prior art ECR.

As shown in FIG. 1, the personal cashier number and/or the personal identification number of the cashier are supplied as input data in a step 71. In a step 72, the input data is collated with the stored information regarding the individual cashiers, and, in a step 73, whether the input data is correct or not is decided. If the input is not correct, the input data is discarded in a step 76, and the error is displayed in a step 77 to complete the operation. On the other hand, if the input data is correct, processing for registering the amount of sales is continued in a step 74 until the operation of the ECR ends in a step 75.

However, in the prior art ECR, the validity or invalidity of the registration of a cashier was only determined on the basis of "whether or not the personal cashier number of the cashier is registered already?" or "whether or not the personal cashier number and the personal identification number coincide with those registered already?". Once the information regarding the individual cashiers was stored in the ECR, to be used for the decision of validity or invalidity, it was not easy to alter this information. Therefore, any one could freely operate the ECR, provided that the personal cashier number or both the personal cashier number and the personal identification number coincided with the number or numbers that were registered. This means that, although a personal identification number was employed, a cashier having a personal cashier number coinciding with that registered could easily operate the ECR. Furthermore a cashier who knew the personal identification number of another cashier having another personal cashier number could easily operate the ECR using the personal cashier number of the other cashier. Thus, there was a management problem with regard to the money received in the drawer of the ECR.

Some practical examples are: "a cashier A used the personal cashier number of a cashier B and stole money from the drawer of the ECR", "a cashier A used his or her own personal cashier number to steal money from the drawer of the ECR during off-duty time and insisted that someone else used his or her own personal cashier number", "a cashier A using the personal cashier number of another cashier B made a registration cancelling procedure during accounting, and after receiving the proper amount of money from the customer, embezzled the money" and so on. Thus, the problem arose that, when a cashier was illegally registered as a register operator, the responsibility of the cashier could not be clarified on the record, such as a journal, and it was difficult to properly manage the money received in the drawer of the ECR.

SUMMARY OF THE INVENTION

With a view to solving such a prior art problem, it is an object of the present invention to provide an ECR which can successfully determine the "validity" or "invalidity" of the registration of a cashier as a register operator, so that, even if the personal cashier number and the personal identification number of the cashier are correct, the cashier cannot basically operate the ECR in his or her off-duty time.

To attain the above object, an ECR according to the present invention employs flag information for "validating" or "invalidating" registration of each cashier as a register operator. When a cashier starts to work on the ECR or the ECR is specifically operated by the manager, the flag information is updated so that the registration of the specific cashier as the register operator can be validated, and when the cashier stops working or the ECR is specifically operated by the manager, the flag information is updated so that the registration of the specific cashier as the register operator can be invalidated. The ECR transmits the updated flag information to all of other ECRs connected thereto so as to control the "validity" or "invalidity" of the registration of the cashier as the register operator.

Therefore, according to the present invention, the ECR has the flag information which "validates" or "invalidates" the registration of each individual cashier as a register operator, so that the "validity" or "invalidity" of the registration of a register operator can be decided by referencing the flag information supplied as input data from the ECR. Thus, the validity or invalidity of the registration can be controlled so that an individual cashier cannot operate the ECR except during times when the cashier is on-duty.

Further, because the cashier cannot operate the ECR while off-duty, the present invention provides another advantage in that the responsibility for the money received in the drawer of the ECR can be further clarified, and the money can be more securely managed.

DESCRIPTION OF THE PREFERRED EMBODIMENT

Figure 1:
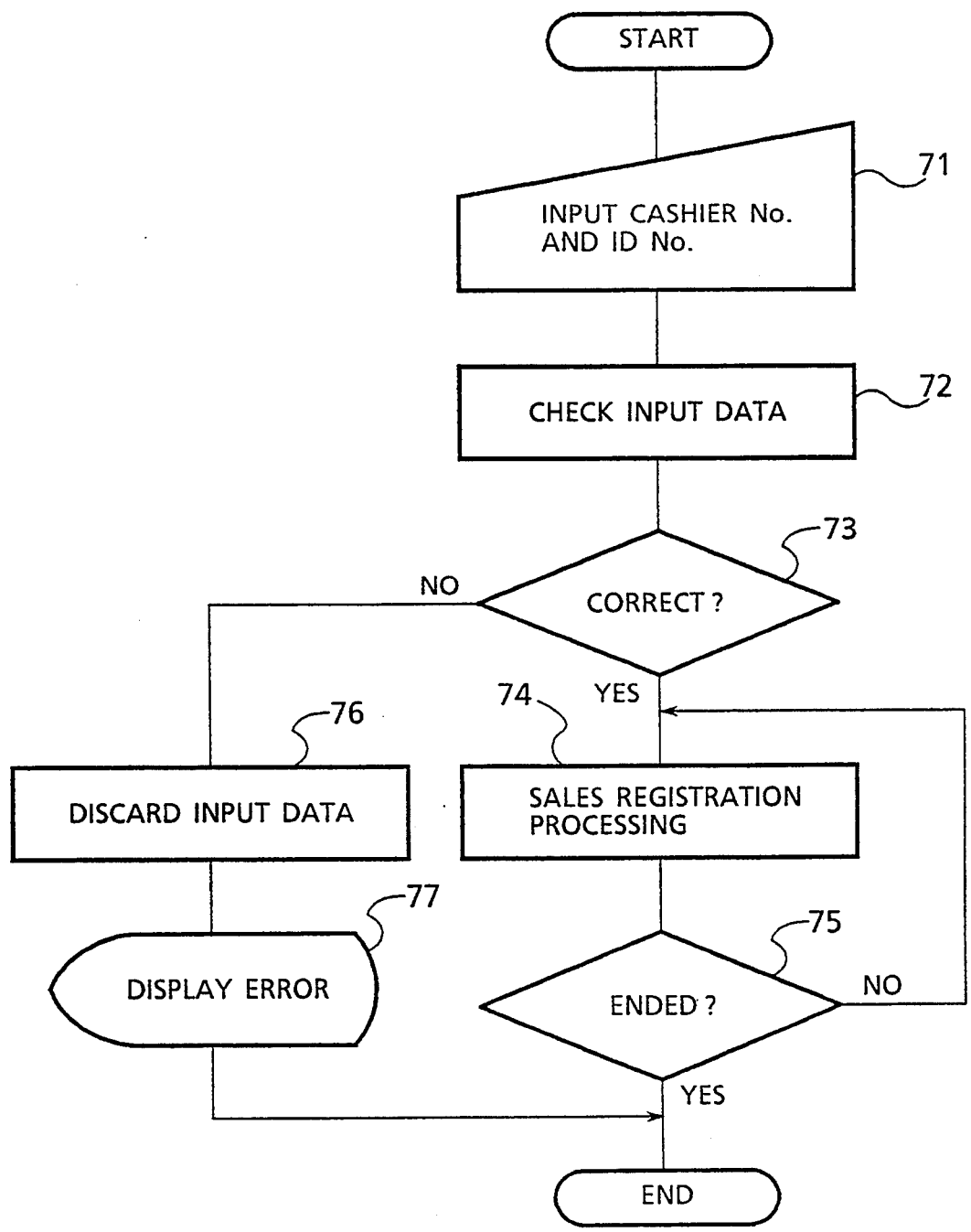
FIG. 1 is a flow chart showing how a prior art ECR is operated.
Figure 2:
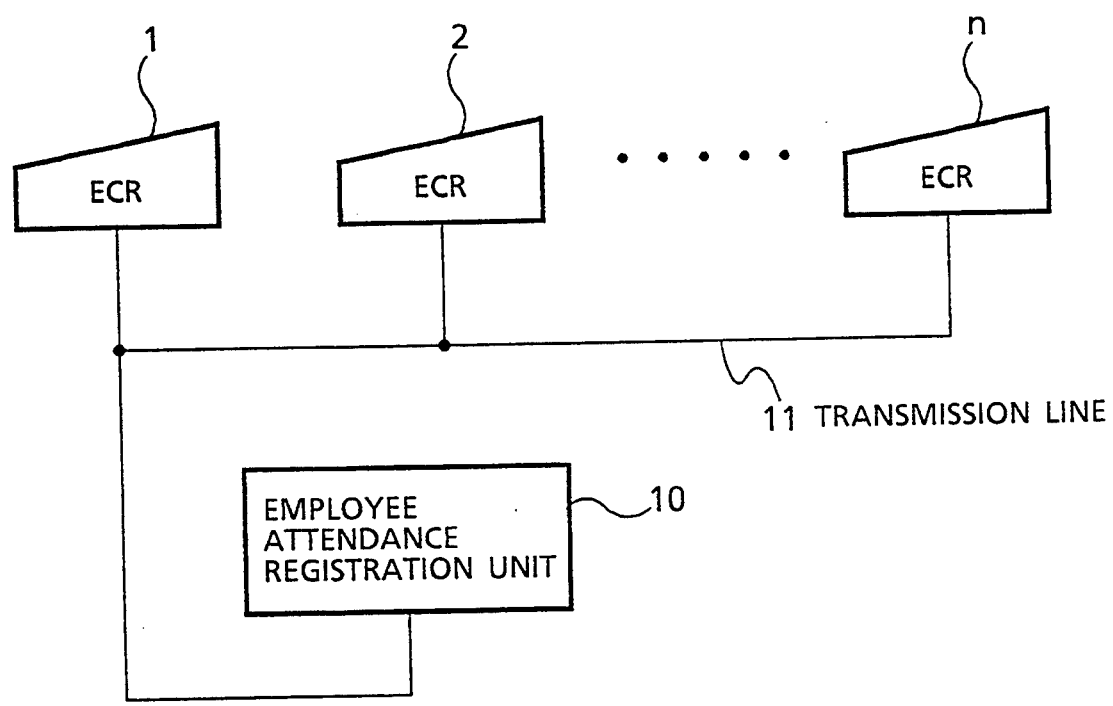
FIG. 2 schematically shows an ECR system consisting of a plurality of ECRs according to an embodiment of the present invention.

FIG. 2 schematically shows an ECR system consisting of a plurality of ECRs 1 to n according to an embodiment of the present invention. As shown in FIG. 2, the ECRs 1 to n and an employee attendance/absence registration unit 10 are interconnected by a common transmission line 11.

Figure 3:
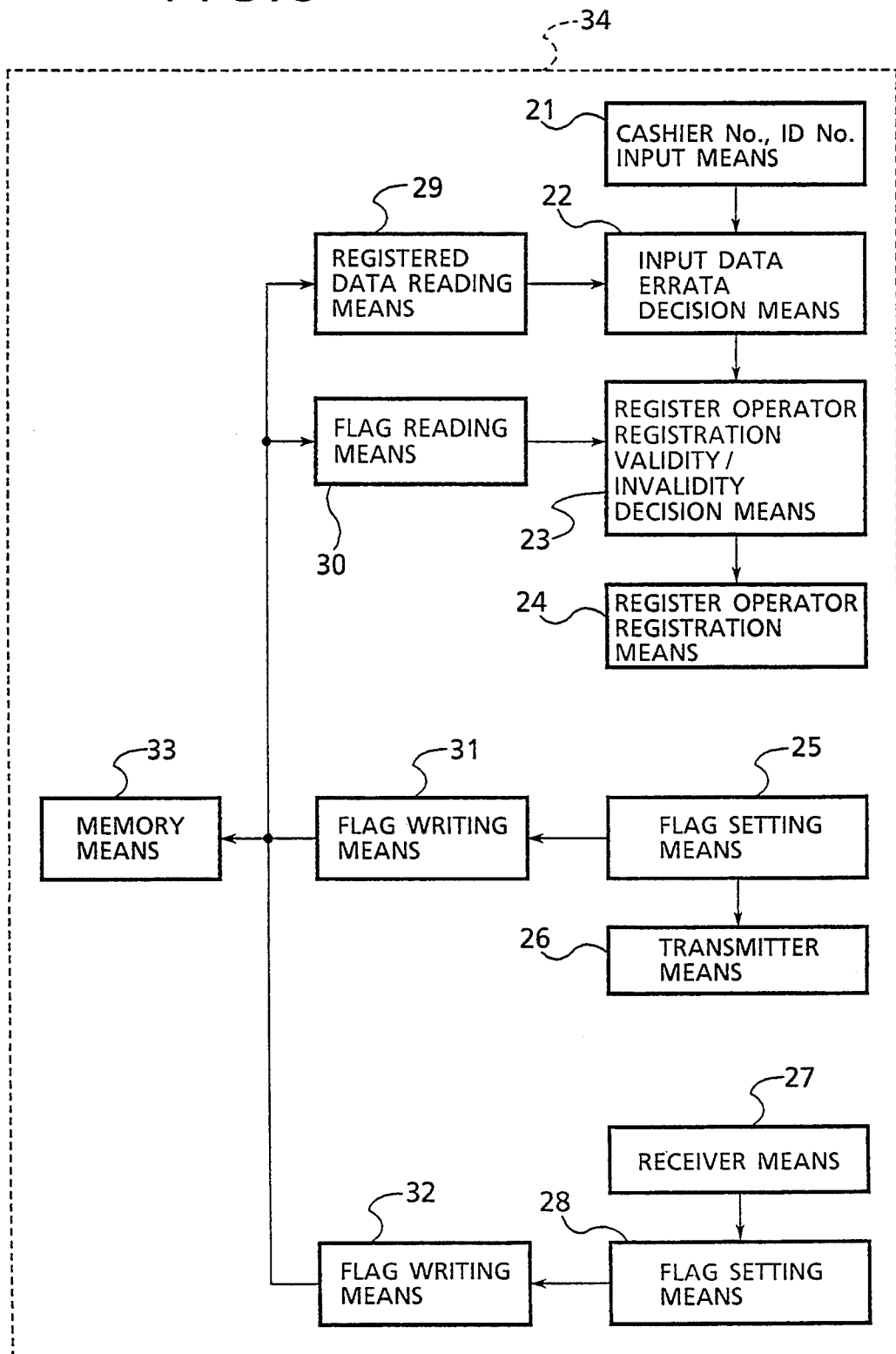
FIG. 3 is a block diagram schematically showing the structure of part of the ECR of the present invention.

FIG. 3 is a block diagram schematically showing part of the ECR embodying the present invention. Referring to FIG. 3, a cashier number, personal identification number input means 21 supplies a cashier number and/or a personal identification number of a register operator as input data to the ECR. An input data errata deciding means 22 decides whether the input data supplied to the input means 21 is correct or not by reference to a registered data reading means 29 connected to a memory means 33. A register operator registration validity-/invalidity deciding means 23 decides whether the register operator registration is valid or invalid by reference to a flag reading means 30 which reads a flag indicating the validity or invalidity of the register operator registration and which is also connected to the memory means 33. When the validity of the register operator registration is decided by the deciding means 23, a register operator registering means 24 registers the valid register operator in the ECR. A flag setting means 25 sets a flag storing the validity or invalidity of the registration of a register operator. The flag setting means 25 sets the flag by reference to a flag writing means 31 which is connected to the memory means 33 to write the information on the flag. The flag information thus set is transmitted to other ECRs from a transmitter means 26 connected to the flag setting means 25. Another flag setting means 28 sets a flag storing the validity or invalidity of the registration of a register operator. When the flag information transmitted from another ECR is received by a receiver means 27, the flag setting means 28 sets the flag by reference to a flag writing means 32 which is connected to the memory means 33 to write the information concerning the flag.

Figure 4:
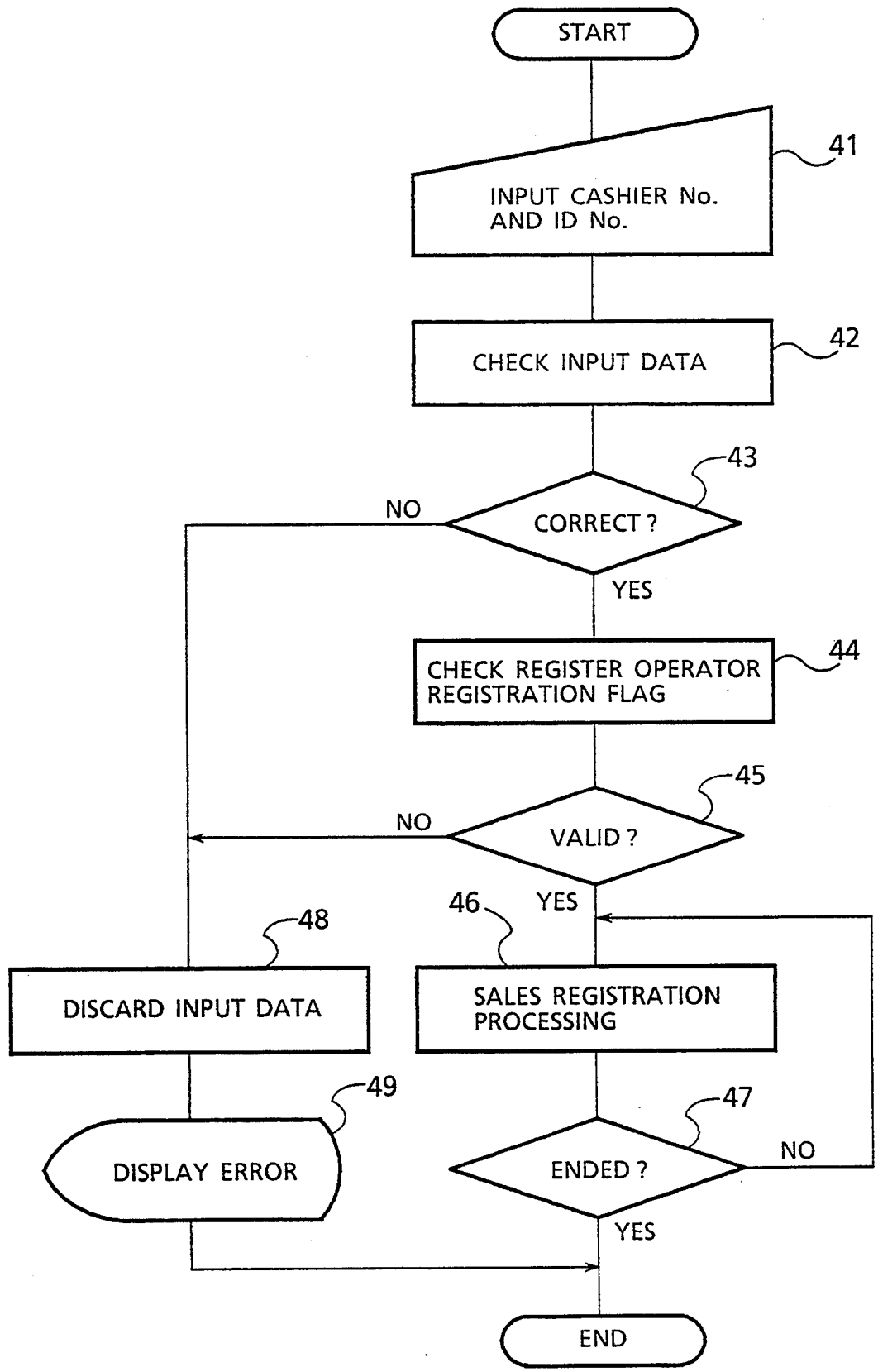
FIG. 4 is a flow chart showing in detail the operation of the ECR of the present invention.

FIG. 4 is a flow chart showing in detail the operation of the ECR embodying the present invention. The operation of the embodiment will now be described by reference to FIG. 4. First, the cashier number or both the cashier number and the personal identification number of a cashier are supplied as input data to the ECR in a step 41. In a step 42, the input data is compared with information regarding individual cashiers, and, in a step 43, whether the input data is correct or not is decided. If the input data is not correct, the data is discarded in a step 48, and the error is displayed in a step 49 to complete the operation of the ECR. On the other hand, if the input data is correct, the flag storing the validity or invalidity of the registration of the cashier as a register operator is checked in a step 44, and whether the registration of the cashier as the register operator is valid or not is decided in a step 45. If the registration of the cashier as the register operator is invalid, the input data is discarded in the step 48, and the error is displayed in the step 49 to complete the operation of the ECR. If the flag information is valid, processing for registration of the amount of sales is continued in a step 46 until the operation of the ECR is ended in a step 47.

Figure 5:
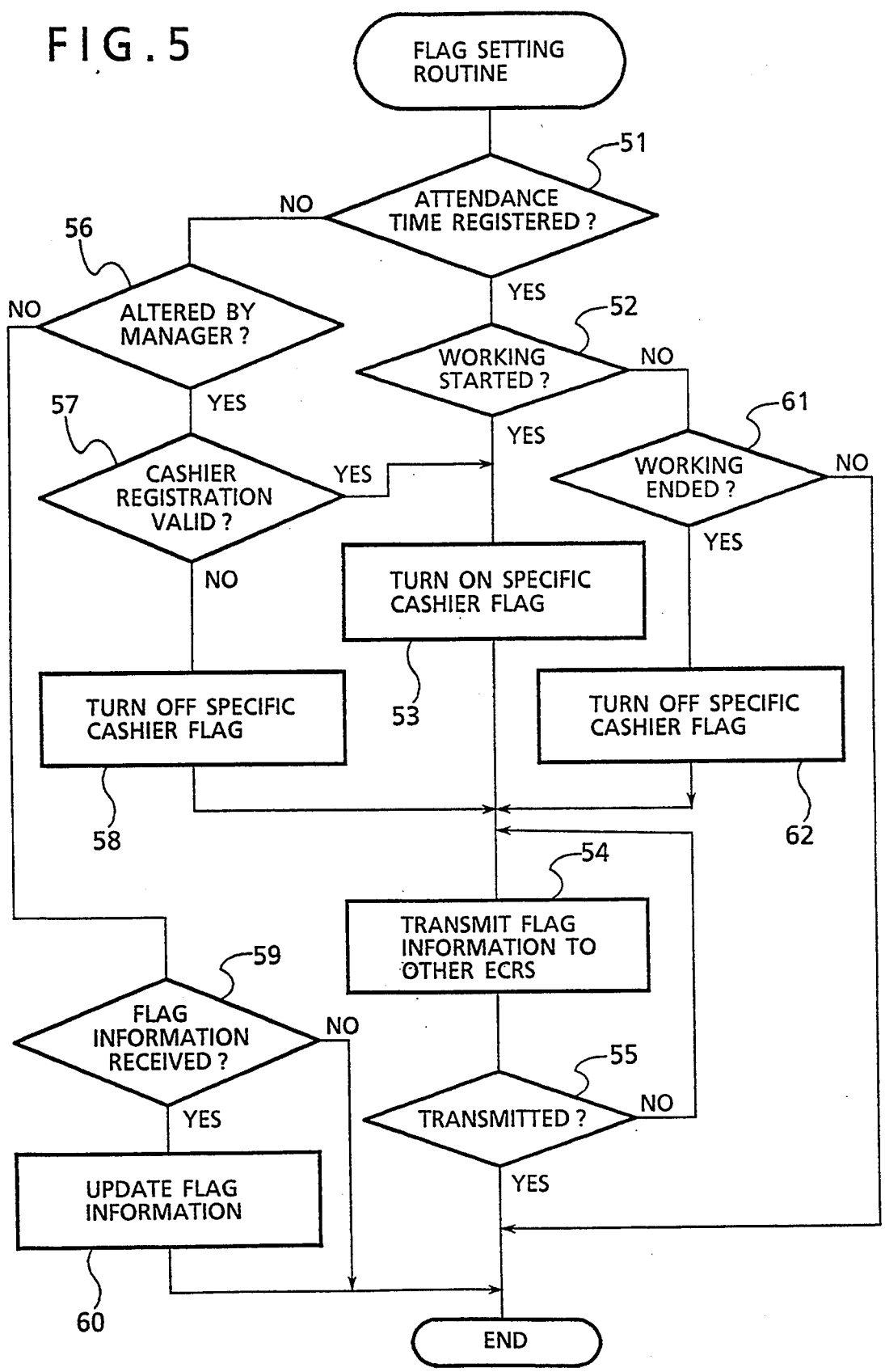
FIG. 5 is a flow chart showing the operation for setting the flag information regarding the validity or invalidity of the registration of a cashier as a register operator.

FIG. 5 is a flow chart illustrating how the flag storing the validity or invalidity of the registration of a cashier as a register operator is set in the ECR embodying the present invention.

The routine for flag setting according to the present invention will be described by reference to FIG. 5. First, in a step 51, whether the attendance or absence time of a cashier is registered in the employee attendance/absence registration unit 10 is checked. If the attendance of the cashier is registered, whether the cashier is starting to work is decided in a step 52, and if the cashier is not starting to work, whether the cashier is ending working is decided in a step 61. If the cashier is starting to work, the register operator registration flag for the specific cashier is turned on in a step 53. On the other hand, if the cashier is ending working, the register operator registration flag for the specific cashier is turned off in a step 62, and the register operator registration flag information is transmitted in a step 54 to the other ECRs. If the information transmission fails, the flag information is transmitted again in a step 55. On the other hand, if the decisions prove that the cashier is neither starting working nor ending working, as when the cashier rests from work for a while, no step is taken in the routine. Further, even if the attendance or absence of the cashier is not registered in the registration unit 10, the manager can alter the register operator registration flag for the specific cashier in a step 56. In this case too, if it is desired to validate the register operator registration for the specific cashier in a step 57, the register operator registration flag for the specific cashier is turned on in the step 53, and if it is desired to invalidate the register operator registration for the specific cashier, the register operator registration flag for the specific cashier is turned off in a step 58. Then, the register operator flag information is transmitted in the step 54 to the other ECRs. In this case too, the flag information is transmitted again in step 55 if the flag information transmission is not successful. On the other hand, if other register operator registration flag information from any one of the other ECRs is received in a step 59, the register operator registration flag information in the ECR is updated in a step 60.

It will be apparent from the foregoing description of the ECR according to the present invention that the ECR has flag information which "validates" or "invalidates" registration of each individual cashier as a register operator, so that the flag information regarding the "validity" or "invalidity" of the registration of a register operator supplied as an input from the ECR can be decided by reference to the flag information. Thus, the present invention is advantageous in that the validity or invalidity of the registration can be controlled so that individual cashiers cannot operate the ECR except during their on-duty times.

Also, because a cashier cannot operate the ECR while off-duty, the present invention provides another advantage in that the responsibility for the money received in the drawer of the ECR can be further clarified, and the money can be more securely managed.

We claim:

1. An electronic cash register system including a plurality of electronic cash registers interconnected by a common transmission line, each of said electronic cash registers comprising:
   information registering means for registering flag information which validates or invalidates registration of a cashier as a register operator,
   memory means for storing said flag information, and
   information transmission means for transmitting said flag information to other electronic cash registers,
   wherein when said flag information is updated, said memory means stores updated flag information and said information transmission means simultaneously transmits said updated flag information to other electronic cash registers interconnected through said common transmission line, and wherein said electronic cash registers further comprise:
means for receiving said flag information,
means for updating the flag information in said memory means, and
means for referencing said stored flag information to determine the validity or invalidity of registration of the cashier as a register operator on the basis of said stored flag information.

2. An electronic cash register system according to claim 1, further comprising means for controlling the validity or invalidity of registration of the cashier as a register operator and preventing the cashier from operating the electronic cash register except during an on-duty time, even if both a cashier number and a personal identification number of the cashier are correct.

3. An electronic cash register system according to claim 1, wherein when the cashier finishes work or said electronic cash register is specifically operated by the manager, said means for updating said flag information invalidates the registration of said specific cashier as a register operator, and said means for transmitting transmits updated flag information to all of said electronic cash registers to thereby control the validity or invalidity of the registration of said specific cashier as a register operator.

4. An electronic cash register system for use by an establishment which employs a plurality of cashiers having on-duty periods, comprising:
a first electronic cash register which includes
first input means for receiving data input by cashiers,
first memory means for storing a characteristic number and a flag for each cashier,
first flag-setting means for turning the flags stored in the first memory means on during the on-duty periods of the cashiers, and
first cashier registration means for permitting a particular one of the cashiers to operate the first electronic cash register if a number which the particular one of the cashiers inputs on the first input means matches a characteristic number stored in the first memory means and if the flag stored in the first memory means for the particular one of the cashiers is on;
a second electronic cash register which includes
second input means for receiving data input by cashiers,
second memory means for storing a characteristic number and a flag for each cashier,
second flag-setting means for turning the flags stored in the second memory means on during the on-duty periods of the cashiers, and
second cashier registration means for permitting a particular one of the cashiers to operate the second electronic cash register if a number which the particular one of the cashiers inputs on the second input means matches a characteristic number stored in the second memory means and if the flag stored in the second memory means for the particular one of the cashiers is on; and
a common transmission line which interconnects the first and second electronic cash registers,
wherein the first electronic cash register additionally includes
first transmitting means for transmitting information about flags that are turned on or off by the first flag-setting means to the second electronic cash register over the common transmission line, and
first receiving means for receiving information about flags that are turned on or off by the second flag-setting means over the common transmission line, and
wherein the second electronic cash register additionally includes
second transmitting means for transmitting information about flags that are turned on or off by the second flag-setting means to the first electronic cash register over the common transmission line, and
second receiving means for receiving information about flags that are turned on or off by the first flag-setting means over the common transmission line.

5. The electronic cash register system of claim 4, wherein the first flag-setting means comprises means for turning the flag for a particular one of the cashiers on in the first memory means when the particular one of the cashiers begins working and for turning the flag for the particular one of the cashiers off in the first memory means when the particular one of the cashiers finishes working.

6. The electronic cash register system of claim 5, wherein the establishment additionally has a manager, and wherein the first flag-setting means additionally comprises means for selectively turning flags in the first memory means on or off at the discretion of the manager.

7. The electronic cash register system of claim 6, wherein the second flag-setting means comprises means for turning the flag for a particular one of the cashiers on in the second memory means when the particular one of the cashiers begins working and for turning the flag for the particular one of the cashiers off in the second memory means when the particular one of the cashiers finishes working.

8. The electronic cash register system of claim 7, wherein the second flag-setting means additionally comprises means for selectively turning flags in the second memory means on or off at the discretion of the manager.

* * * * *